US009405625B2

(12) United States Patent
Fiske et al.

(10) Patent No.: US 9,405,625 B2
(45) Date of Patent: *Aug. 2, 2016

(54) OPTIMIZING AND ENHANCING PERFORMANCE FOR PARITY BASED STORAGE

(71) Applicant: International Business Machines Corporation, Armonk, NY (US)

(72) Inventors: Rahul M. Fiske, Pune (IN); Kalyan C. Gunda, Bangalore (IN); Carl E. Jones, Tucson, AZ (US); Sandeep R. Patil, Pune (IN); Subhojit Roy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/670,844

(22) Filed: Mar. 27, 2015

(65) Prior Publication Data
US 2015/0199235 A1    Jul. 16, 2015

Related U.S. Application Data

(63) Continuation of application No. 13/230,248, filed on Sep. 12, 2011, now Pat. No. 8,996,804.

(51) Int. Cl.
*G06F 11/10* (2006.01)
(52) U.S. Cl.
CPC ........ *G06F 11/1076* (2013.01); *G06F 11/1048* (2013.01); *G06F 2211/1054* (2013.01)
(58) Field of Classification Search
CPC ............ G06F 11/1076; G06F 11/1032; G06F 11/1048
See application file for complete search history.

(56) References Cited

U.S. PATENT DOCUMENTS

| 7,024,586 | B2 | 4/2006 | Kleiman et al. |
| 7,155,466 | B2 | 12/2006 | Rodriguez et al. |
| 7,536,521 | B2 | 5/2009 | Sivathanu et al. |
| 7,711,897 | B1 | 5/2010 | Chatterjee et al. |
| 2004/0215877 | A1 | 10/2004 | Chatterjee et al. |
| 2006/0200357 | A1 | 9/2006 | Dewey |
| 2007/0047395 | A1 | 3/2007 | Skeeter et al. |
| 2013/0067273 | A1 | 3/2013 | Fiske et al. |

OTHER PUBLICATIONS

U.S. Appl. No. 13/230,248.
"Parity Bit", Retrieved from http://en.wikipedia.org/wiki/Parity_bit on Jan. 31, 2014, 6 pages.

*Primary Examiner* — Gary W Cygiel
(74) *Attorney, Agent, or Firm* — Stephen R. Tkacs; Stephen J. Walder, Jr.; Randall J. Bluestone

(57) ABSTRACT

A mechanism is provided for optimizing and enhancing performance for parity based storage, particularly redundant array of independent disk (RAID) storage. The mechanism optimizes a repetitive pattern write command for performance for storage configurations that require parity calculations. The mechanism eliminates the need for laborious parity calculations that are resource intensive and add to IO latency. For repetitive write commands that span across the full stripe of a RAID5 or similar volume, the mechanism calculates parity by looking at the pattern and the number of columns in the volume. The mechanism may avoid the XOR operation altogether for repetitive pattern write commands. The mechanism may enhance secure delete operations that use repetitive pattern write commands by eliminating data reliability operations like parity generation and writing altogether.

20 Claims, 5 Drawing Sheets

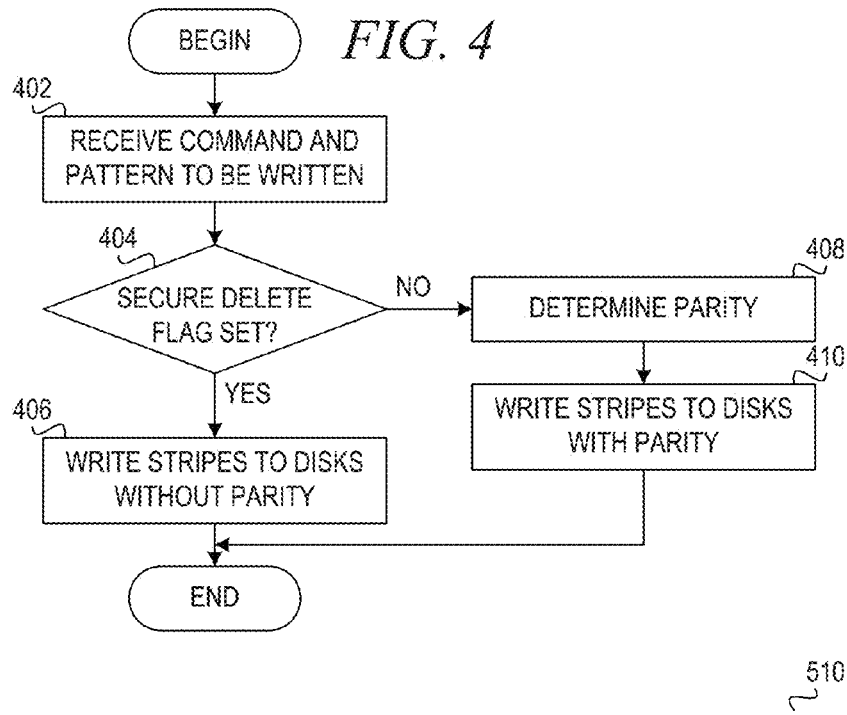
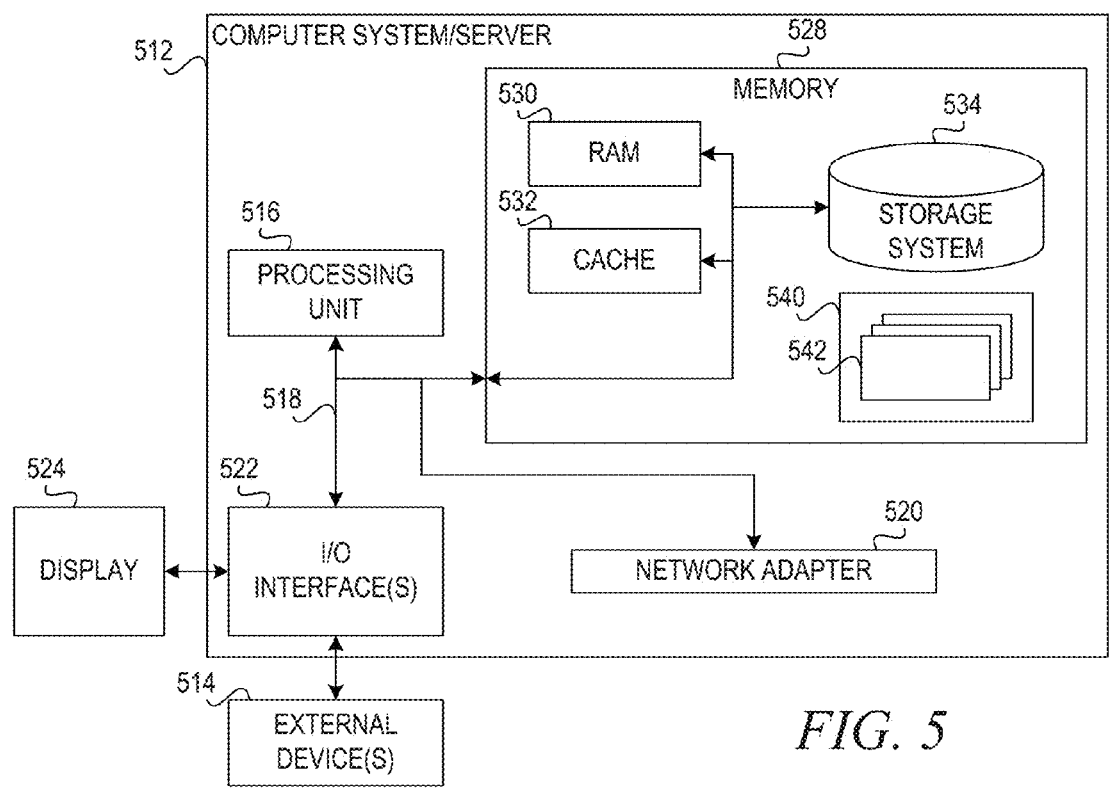

OPTIMIZING AND ENHANCING PERFORMANCE FOR PARITY BASED STORAGE

BACKGROUND

The present application relates generally to an improved data processing apparatus and method and more specifically to mechanisms for optimizing and enhancing performance for parity based storage, particularly redundant array of independent disk (RAID) storage.

Redundant Array of Independent Disks (RAID), is a technology that provides increased storage functions and reliability through redundancy. This is achieved by combining multiple disk drive components into a logical unit, where data is distributed across the drives in one of several ways called "RAID levels." RAID is an example of storage virtualization. RAID is now used as an umbrella term for computer data storage schemes that can divide and replicate data among multiple physical disk drives. The physical disks are said to be in a RAID array, which is accessed by the operating system as one single disk. The different schemes or architectures are named by the word RAID followed by a number (e.g., RAID 0, RAID 1). Each scheme provides a different balance between two key goals: increase data reliability and increase input/output performance.

A number of standard schemes have evolved which are referred to as levels. There were five RAID levels originally conceived, but many more variations have evolved, notably several nested levels and many non-standard levels (mostly proprietary).

RAID 0 (block-level striping without parity or mirroring) has no (or zero) redundancy. RAID 0 provides improved performance and additional storage but no fault tolerance. Simple stripe sets are normally referred to as RAID 0. Any disk failure destroys the array, and the likelihood of failure increases with more disks in the array. A single disk failure destroys the entire array because when data is written to a RAID 0 volume, the data is broken into fragments called blocks. The number of blocks is dictated by the stripe size, which is a configuration parameter of the array. The blocks are written to their respective disks simultaneously on the same sector. This allows smaller sections of the entire chunk of data to be read off the drive in parallel, increasing bandwidth. RAID 0 does not implement error checking, so any error is uncorrectable. More disks in the array means higher bandwidth, but greater risk of data loss.

In RAID 1 (mirroring without parity or striping), data is written identically to multiple disks (a "mirrored set"). The array continues to operate as long as at least one drive is functioning. With appropriate operating system support, there can be increased read performance, and only a minimal write performance reduction; implementing RAID 1 with a separate controller for each disk in order to perform simultaneous reads (and writes) is sometimes called multiplexing (or duplexing when there are only 2 disks).

In RAID 2 (bit-level striping with dedicated Hamming-code parity), all disk spindle rotation is synchronized, and data is striped such that each sequential bit is on a different disk. Hamming-code parity is calculated across corresponding bits on disks and stored on at least one parity disk.

In RAID 3 (byte-level striping with dedicated parity), all disk spindle rotation is synchronized, and data is striped so each sequential byte is on a different disk. Parity is calculated across corresponding bytes on disks and stored on a dedicated parity disk.

RAID 4 (block-level striping with dedicated parity) is identical to RAID 5 (see below), but confines all parity data to a single disk, which can create a performance bottleneck. In this setup, files can be distributed between multiple disks. Each disk operates independently which allows I/O requests to be performed in parallel, though data transfer speeds can suffer due to the type of parity. The error detection is achieved through dedicated parity and is stored in a separate, single disk unit.

RAID 5 (block-level striping with distributed parity) distributes parity along with the data and requires all drives but one to be present to operate; the array is not destroyed by a single drive failure. Upon drive failure, any subsequent reads can be calculated from the distributed parity such that the drive failure is masked from the end user. However, a single drive failure results in reduced performance of the entire array until the failed drive has been replaced and the associated data rebuilt.

RAID 6 (block-level striping with double distributed parity) provides fault tolerance of two drive failures. The array continues to operate with up to two failed drives. This makes larger RAID groups more practical, especially for high-availability systems. This becomes increasingly important as large-capacity drives lengthen the time needed to recover from the failure of a single drive. Single-parity RAID levels are as vulnerable to data loss as a RAID 0 array until the failed drive is replaced and its data rebuilt. The larger the drive, the longer the rebuild takes. Double parity gives time to rebuild the array without the data being at risk if a single additional drive fails before the rebuild is complete.

Many RAID levels employ an error protection scheme called "parity." The XOR parity calculation is a widely used method in information technology to provide fault tolerance in a given set of data. In Boolean logic, there is an operation called exclusive or (XOR), meaning "one or the other, but not neither and not both." The XOR operator is central to how parity data is created and used within an array. It is used both for the protection of data, as well as for the recovery of missing data. Thus, a RAID controller must perform the XOR command every time a stripe is written to create parity.

SUMMARY

In one illustrative embodiment, a method, in a data processing system, is provided for optimizing and enhancing performance for parity based storage. The method comprises receiving a repetitive write command and an associated pattern to be written to a portion of parity based storage volume. The method further comprises optimizing parity calculation for the repetitive write command. The method further comprises writing the pattern to the portion of the parity based storage volume based on the optimization.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 4 is a flowchart illustrating operation of a mechanism for optimizing a repetitive write for a secure delete operation in accordance with an illustrative embodiment;

FIG. 5 depicts a cloud computing node according to an illustrative embodiment;

DETAILED DESCRIPTION

The illustrative embodiments provide a mechanism for optimizing and enhancing performance for parity based storage, particularly redundant array of independent disk (RAID) storage. The mechanism optimizes a repetitive pattern write command for performance for storage configurations that require parity calculations.

In one illustrative embodiment, the mechanism makes use of the fact that the certain commands, such as the WRITE-SAME command, involve writing repetitive patterns. The mechanism eliminates the need for laborious parity calculations. For WRITE-SAME commands that span across the full stripe of a RAID5 or similar volume, the mechanism calculates parity by looking at the pattern and the number of columns in the volume. The mechanism may avoid the XOR operation altogether for repetitive pattern write commands.

In another illustrative embodiment, the mechanism enhances secure delete operations that use repetitive pattern write commands by eliminating data reliability operations like parity generation and writing altogether. Because secure delete operations require no reliability, the mechanism can eliminate parity generation. This has the potential to boost performance of the secure delete operation significantly as there will be no I/O and no processor computation involved for parity generation.

The WRITE-SAME command is a small computer system interface (SCSI) command that is used to overwrite large sections of disk with repetitive patterns, such as zeroes. Using WRITE-SAME has the benefit that the host does not have to unnecessarily transfer repetitive patterns in order to achieve overwriting of a region on the disk. Because large sections of the disk are involved during an overwrite operation, optimizing this command can benefit applications that use the command.

Figure 1:
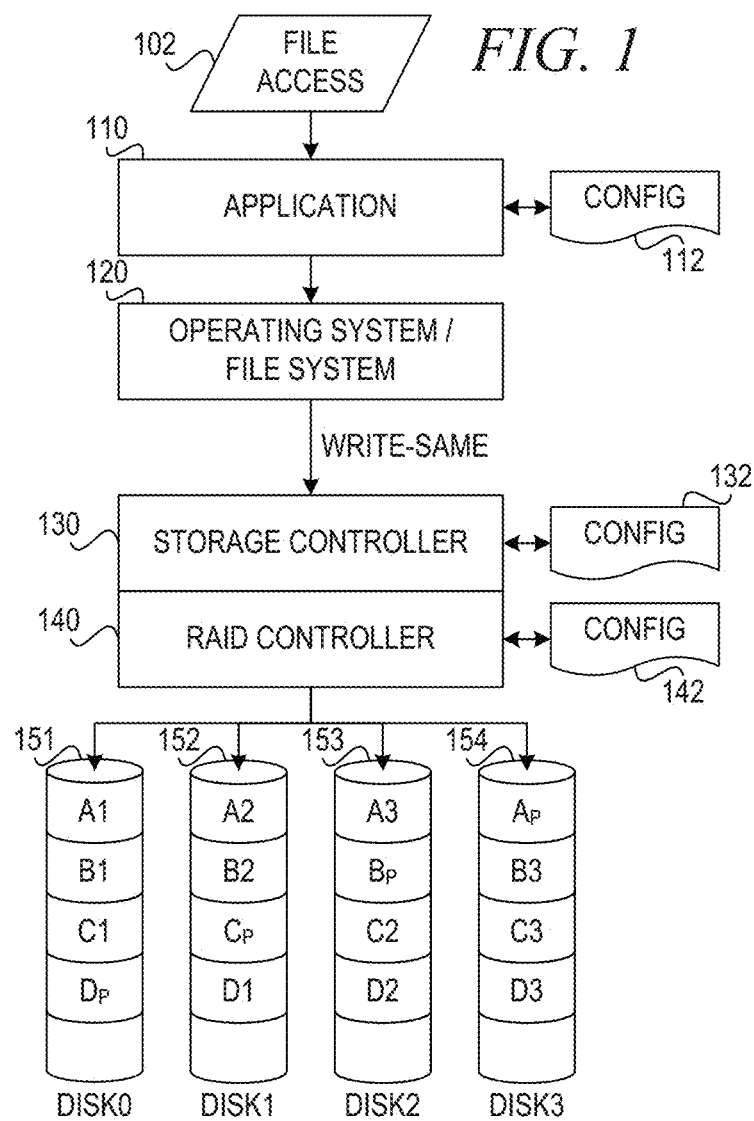
FIG. 1 is a block diagram illustrating a data processing system in which aspects of the illustrative embodiments may be implemented.

FIG. 1 is a block diagram illustrating a data processing system in which aspects of the illustrative embodiments may be implemented. Application 110 receives a file access 102, such as a request from a user. In the illustrative embodiment, the file access may be a request to overwrite a large portion of a storage volume or a request to perform a secure delete operation, for example. In response to the file access 102, application 110 makes one or more calls to operating system and/or file system 120.

Operating system/file system 120 sends a WRITE-SAME SCSI command to storage controller 130 with a pattern to be repeatedly written to the volume. RAID controller 140 then writes the pattern to disk0 151, disk1 152, disk2 153, and disk3 154. More particularly, in the depicted example, RAID controller 140 uses RAID5 level to perform block-level striping with distributed parity. While the depicted example shows RAID5 with four columns using a WRITE-SAME SCSI command, the illustrative embodiments may apply to other parity based storage configurations and other repetitive write commands.

The significance and use of the WRITE-SAME SCSI command is on the rise, as the command is used for server virtualization, thin provisioning, and cloud storage applications to achieve multi-tenancy. Thus, it is important to improve the performance of the command. In accordance with the illustrative embodiment, RAID controller 140 takes advantage of the repetitive nature of the WRITE-SAME command to make the command operate faster. RAID controller 140 uses a formula involving the number of columns in the RAID5 volume, full stripe size, and the data pattern issued by the application in order to calculate parity for the WRITE-SAME command, instead of using XOR operation to arrive at parity.

As an example, suppose a pattern ABC of size 512 bytes is issued via the WRITE-SAME command to a RAID5 volume with 4 columns of stripe width 12 k, i.e., three data blocks of size 4 k and one parity block of size 4 k. In order to calculate the parity, RAID controller 140 considers the following:

1) The size of data to be written using the WRITE-SAME command must span the full stripe size of the RAID5 volume.

2) For even number of RAID5 columns (true in the example described above and the example shown in FIG. 1), the RAID controller 140 sets the parity to be the same as the pattern, because the XOR of an odd number of equal patterns is the pattern itself. With an even number of columns, one column is the parity; therefore, the RAID controller 140 would perform the XOR operation over an odd number of data blocks.

3) For an odd number of RAID5 columns, parity is set to zero, because the XOR of a pattern an even number of times results in a value of zero. Again, excluding the parity block, the number of data blocks is an even number. The XOR of an even number of equal patterns is zero.

4) The stripe unit width must be a whole number multiple of the size of the data pattern sent via the WRITE-SAME command.

The above formula may be easily extended to cover other parity based virtual devices, such as RAID4, RAID6, etc.

It is also possible to use repetitive write commands to perform a secure delete operation. A secure delete operation is an act of securely purging contents of storage such that there are no remains on the storage. Secure delete is one of the vital aspects of data security over storage. Many regulatory compliances mandate the need for the secure delete operation. Secure purging of data to meet secure delete requirements is a very common approach. Because secure delete involves multiple levels of writing with different formats, depending on the specification being implemented, it proves to be costly to system performance, because the system must perform many I/O operations.

In accordance with an illustrative embodiment, secure delete can leverage the WRITE-SAME command for repetitive writes to ensure minimum data remanence and to ensure that the application host is not tied up performing this operation for long durations of time.

As stated above, file access 102 may request a secure delete operation to be performed. In accordance with another illustrative embodiment, operating system/file system 120 may perform the secure delete operation using one or more WRITE-SAME commands. Operating system/file system 120 may set a special flag of the WRITE-SAME command, or any other command executing repetitive write cycles at storage controller or disk controller level, indicating that the command is part of a secure delete operation. In one example embodiment, the flag may be part of the cache descriptor block (CDB) of the command.

When the secure delete flag is set for a WRITE-SAME command, RAID controller may skip the parity generation operation altogether and simply overwrite the data blocks of a stripe leaving the parity block the same. RAID controller 140 may implement the above by skipping parity generation cycles. The feature may be optional and user configurable so that no associated standards are broken and backward compatibility issues, if any, are maintained.

Considering the example described above, a file of size 1 GB on a RAID5 configuration with 1 KB block size, which is being securely deleted with a modest three overwrite cycles. The mechanism of the illustrative embodiment saves 3,145,728 parity generation and write cycles.

Application 110 has an associated configuration file 112. A user may configure application 110 to flag repetitive write commands as being part of a secure delete operation setting a secure delete enable/disable field in configuration file 112. In another example embodiment, a user may configure application 110 to flag a repetitive write command to indicate that the pattern is of the appropriate size for optimization at RAID controller 140. Thus, the user may enable/disable optimization by setting an optimization enable/disable field in configuration file 112.

Similarly, storage controller 130 has an associated configuration file 132. A user may set a secure delete enable/disable field in configuration file 132 to enable or disable setting the secure delete flag at the storage controller level. In another example embodiment, the user may configure storage controller 130 to enable or disable all parity calculation optimization by setting an optimization enable/disable field in configuration file 132.

RAID controller 140 has an associated configuration file 142. Using configuration file 142, a user may configure the RAID controller 140 to enable/disable parity computation optimization or to enable/disable parity computation altogether when the repetitive write command is flagged as being part of a secure delete operation.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 2:
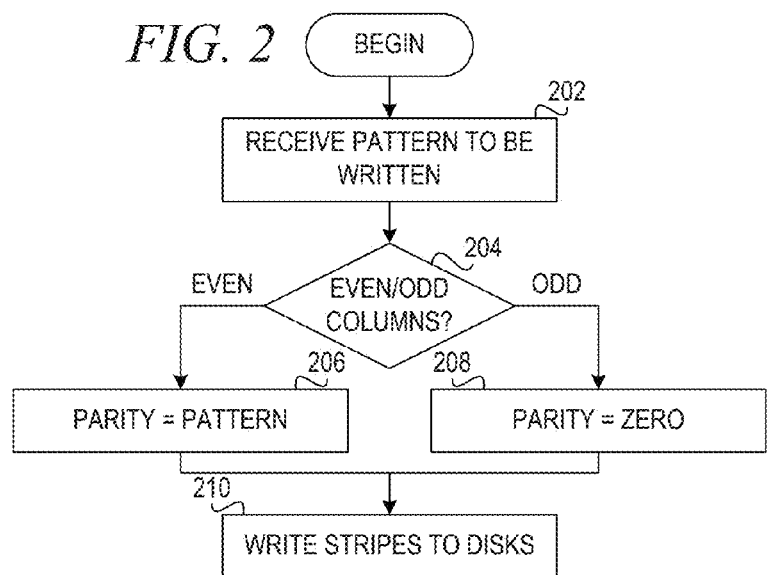
FIG. 2 is a flowchart illustrating operation of a mechanism for optimizing repetitive write operations in accordance with an illustrative embodiment.

FIG. 2 is a flowchart illustrating operation of a mechanism for optimizing repetitive write operations in accordance with an illustrative embodiment. Operation begins, and the mechanism receives a pattern to be written to a storage volume by a repetitive write command (block 202). The storage volume may be a block-level storage scheme with parity, such as RAID5. The mechanism determines whether the storage volume has an even or odd number of columns (block 204). If the volume has an even number of columns, the mechanism sets the parity equal to the pattern (block 206). If the volume has an odd number of columns, the mechanism sets the parity equal to zero (block 208). Thereafter, the mechanism writes the stripes to the disks (block 210), and operation ends.

Figure 3:
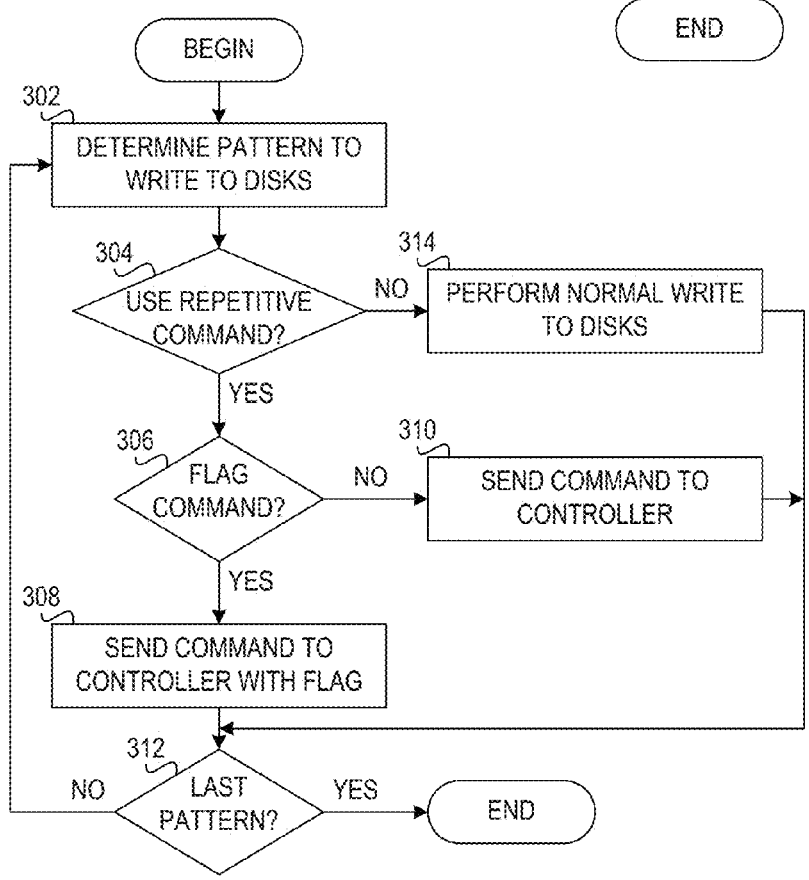
FIG. 3 is a flowchart illustrating operation of a mechanism for performing a secure delete operation in accordance with an illustrative embodiment.

FIG. 3 is a flowchart illustrating operation of a mechanism for performing a secure delete operation in accordance with an illustrative embodiment. Operation begins, and the mechanism determines a pattern to write to disks to purge the data stored in the volume (block 302). The mechanism determines whether to use a repetitive write command, such as the WRITE-SAME command, for the current level of the secure delete operation (block 304). The mechanism may determine whether to use a repetitive write command based on fields set by a user in a configuration file.

If the mechanism determines to use a repetitive write command, the mechanism determines whether to flag the command as being part of a secure delete operation (block 306). The mechanism may determine whether to set the flag based on fields set by a user in a configuration file. If the mechanism determines to set a flag, the mechanism sends the repetitive write command to the controller with the flag (block 308). If the mechanism determines not to set the flag in block 306, the mechanism sends the command to the controller without the flag set (block 310), meaning the RAID controller will calculate parity according to the operations depicted in the flowchart in FIG. 2.

Thereafter, the mechanism determines whether the pattern is the last pattern (block 312), meaning the mechanism determines whether the current level of the secure delete command is the last level. If the mechanism determines that the pattern is not the last pattern, then operation returns to block 302 to determine the next pattern to write to the disks. If the mechanism determines that the pattern is the last pattern in block 312, then operation ends. Returning to block 304, if the mechanism determines that a repetitive write command is not to be used, the mechanism performs a normal write to disk (block 314) and operation ends.

FIG. 4 is a flowchart illustrating operation of a mechanism for optimizing a repetitive write for a secure delete operation in accordance with an illustrative embodiment. Operation begins, and the mechanism receives a repetitive write command and a pattern to be written to the storage volume (block 402). The mechanism determines whether the secure delete flag is set in the command (block 404). If the secure delete flag is set, the mechanism writes the stripes to the disks without parity (block 406). The mechanism may simply leave the parity blocks without overwriting. Thereafter, operation ends.

If the secure delete flag is not set in block 404, the mechanism determines parity (block 408) and writes the stripes to disks with parity (block 410). The mechanism may determine parity according to the operations depicted in the flowchart in FIG. 2. Thereafter, operation ends.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The aspects of the illustrative embodiments may apply to cloud computing services and data protection. The aspects of the illustrative embodiments may be expanded to file systems and distributed file systems over clusters. When an application issues a file deletion command, to comply with compliance rules, the operating system, file system, or storage controller may translate the command to a secure delete and pass a list of blocks to be deleted. The controller may avoid RAID parity calculations for all blocks involved, along with just one logical block optimization described above. The aspects of the illustrative embodiments may extend the advantages described to large blocks, directly proportional to the file size.

In a clustered file system, such as the General Parallel File System (GPFS), where data is distributed across various logical units (LUNs) attached to multiple RAID controllers, each RAID controller can calculate the parity only once, as described above, for repetitive write commands and avoid calculation of parity for all LUNs on a node, thus improving performance significantly and resulting in secure delete completing quickly, saving computing resources, memory, and network traffic. The illustrative embodiments minimize network traffic as the file system now sends the list of blocks and pattern only once, instead of sending data for every block.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 5, a schematic of an example of a cloud computing node is shown. Cloud computing node 510 is only one example of a suitable cloud computing node and is not intended to suggest any limitation as to the scope of use or functionality of embodiments of the invention described herein. Regardless, cloud computing node 510 is capable of being implemented and/or performing any of the functionality set forth hereinabove.

In cloud computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in cloud computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

Bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 512 typically includes a variety of computer system readable media. Such media may be any available media that is accessible by computer system/server 512, and it includes both volatile and non-volatile media, removable and non-removable media.

System memory 528 can include computer system readable media in the form of volatile memory, such as random access memory (RAM) 530 and/or cache memory 532. Computer system/server 512 may further include other removable/non-removable, volatile/non-volatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 518 by one or more data media interfaces. As will be further depicted and described below, memory 528 may include at least one program product having a set (e.g., at least one) of program modules that are configured to carry out the functions of embodiments of the invention.

Program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein. Computer system/server 512 may also communicate with one or more external devices 514 such as a keyboard, a pointing device, a display 524, etc.; one or more devices that enable a user to interact with computer system/server 512; and/or any devices (e.g., network card, modem, etc.) that enable computer system/server 512 to communicate with one or more other computing devices. Such communication can occur via Input/Output (I/O) interfaces 522. Still yet, computer system/server 512 can communicate with one or more networks such as a local area network (LAN), a general wide area network (WAN), and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples, include, but are not limited to: microcode, device drivers, redundant processing units, external disk drive arrays, RAID systems, tape drives, and data archival storage systems, etc.

Figure 6:
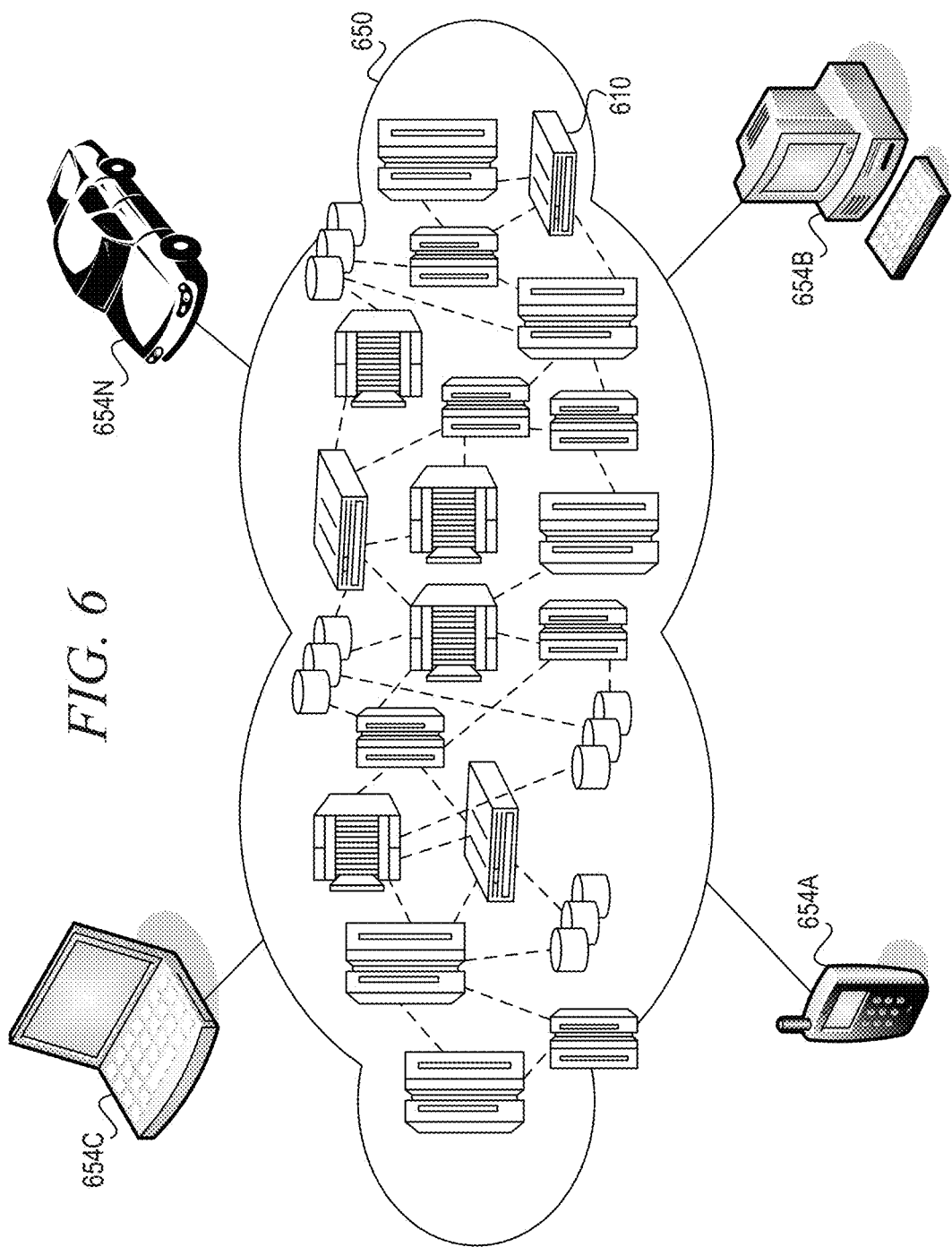
FIG. 6 depicts a cloud computing environment according an illustrative embodiment.

Referring now to FIG. 6, illustrative cloud computing environment 650 is depicted. As shown, cloud computing environment 650 comprises one or more cloud computing nodes 610, such as cloud computing node 510 in FIG. 5, with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
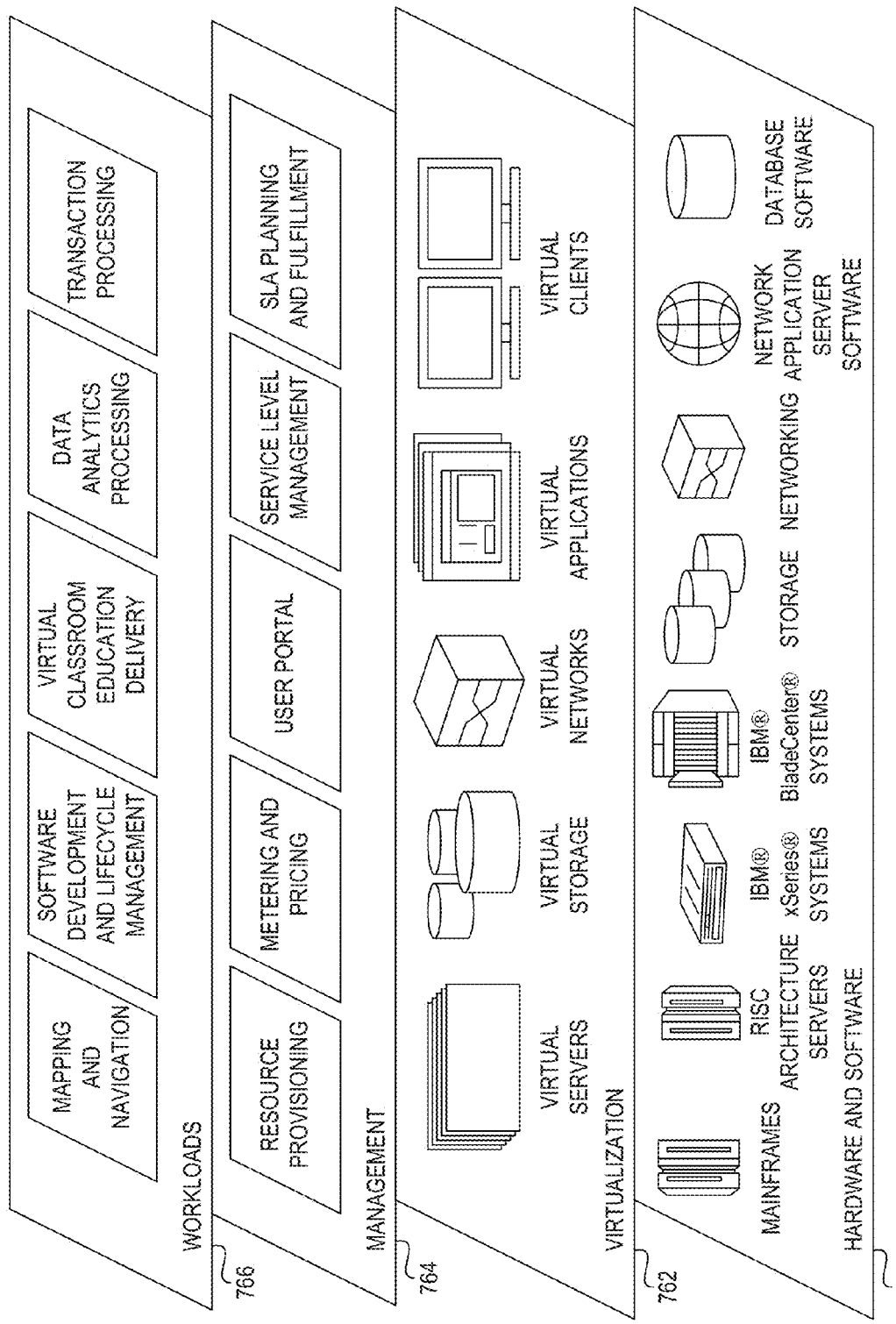
FIG. 7 depicts abstraction model layers according to an illustrative embodiment.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 762 provides an abstraction layer from which the following examples of virtual entities may be provided: virtual servers; virtual storage; virtual networks, including virtual private networks; virtual applications and operating systems; and virtual clients.

In one example, management layer 764 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 766 provides examples of functionality for which the cloud computing environment may be utilized. Examples of workloads and functions which may be provided from this layer include: mapping and navigation; software development and lifecycle management; virtual classroom education delivery; data analytics processing; and, transaction processing.

Particular aspects of the illustrative embodiments may be implemented in management layer 764, virtualization layer 762, or hardware and software layer 760. For example, a file access overwriting or deleting a portion of storage may originate in management layer 764, in virtual servers or virtual applications in virtualization layer 762, or in an application running on mainframes or servers in hardware and software layer 760, for example. Illustrative embodiments for optimizing repetitive write commands and secure delete operations may be implemented in storage within hardware and software layer 760.

Thus, the illustrative embodiments provide mechanisms for optimizing and enhancing performance for parity based storage, particularly redundant array of independent disk (RAID) storage. The mechanism optimizes a repetitive pattern write command for performance for storage configurations that require parity calculations. The mechanism may make use of the fact that the certain commands, such as the WRITE-SAME command, involve writing repetitive patterns. The mechanism eliminates the need for laborious parity calculations. For repetitive write commands that span across the full stripe of a RAID5 or similar volume, the mechanism calculates parity by looking at the pattern and the number of columns in the volume. The mechanism may avoid the XOR operation altogether for repetitive pattern write commands. The mechanism may enhance secure delete operations that use repetitive pattern write commands by eliminating data reliability operations like parity generation and writing altogether. Because secure delete operations require no reliability, the mechanism can eliminate parity generation. This has the potential to boost performance of the secure delete operation significantly as there will be no I/O and no processor computation involved for parity generation.

Implementation of the illustrative embodiments is very simple and straight forward. The illustrative embodiments help reduce the time consumed to execute repetitive write command significantly. The illustrative embodiments save resources on the device server executing the repetitive write command. The illustrative embodiments can make secure delete operations involving repetitive write commands speed up considerably. Given that large sections of the disk can be overwritten during secure delete operations, executing repetitive write commands faster has benefits for the applications that require secure delete. In addition, the illustrative embodiments can ensure that initialize to zero required by server virtualization solutions can execute faster. Storage Multi Tenancy operations that are very frequent in Cloud Applications use cases can benefit by a faster zero out or overwrite operations.

Furthermore, the illustrative embodiments avoid CPU/IO cycles for RAID parity generation/writing altogether. Every write cycle avoided results in less heat dissipation and generates less carbon footprint by impacting the running cost of clouds/datacenters. Less heat dissipation results in lower cooling requirements and, hence, less power for cooling. Write cycles being power consumption intensive, every write cycle saved reduces power consumption.

In addition, fewer write cycles directly lessens the adjacent track erasure problems associated with hard disk drives. In hard disk drives (HDDs), deleterious effects can occur that are known as adjacent track erasure (ATE), all caused by inadvertent erasure of data that is underneath certain portions of the recording head during disk driver operation. If one keeps writing to a particular track continuously, there is a good probability that data from adjacent tracks can get deleted. Hence, a data track is refreshed after the adjacent tracks have been continuously written for a certain number of times in order to reduce the damage. This problem is highly visible when one has data that has secure delete requirements imposed on it. This is due to repetitive writes on the same blocks as per many current compliance requirements. By avoiding parity write cycles, the illustrative embodiments tend to save the refresh cycles, which otherwise the HDD would compensate for due to the ATE effect.

It must be noted that some disk controllers scan incoming user data for repetitive zeros written via a standard SCSI WRITE command with repeated blocks of zeros. Since the disk controller already scans for zeros, the same technique mentioned in this invention can be extended to include parity optimization for WRITE zeros as well, without any additional overhead due to scanning of zeros in user data (because that is already done).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a storage controller, for optimizing and enhancing performance for parity based storage, the method comprising:

receiving from a host device a repetitive write command and an associated pattern to be written a plurality of times to a portion of a parity based storage volume, wherein the parity based storage volume employs block-level striping with parity and wherein the repetitive write command has an associated flag;

determining, by the storage contoller, whether the flag is set;

determining, by the storage controller, whether a size of data to be written by the repetitive write command spans a full stripe size of the parity based storage volume;

determining, by the storage controller, whether a stripe unit width of the parity based storage volume is a whole number multiple of a size of the associated pattern;

responsive to the storage controller determining that the flag is not set and the size of data to be written by the repetitive write command spans the full stripe size of the parity based storage volume and the stripe unit width of the parity based storage volume is a whole number multiple of the size of the associated pattern, optimizing parity calculation for the repetitive write command by the storage controller, wherein optimizing parity calculation comprises setting parity for a given stripe within the portion of the parity based store volume to be the pattern or zeroes based on a number of columns in the parity based storage volume; and writing the pattern with the parity to the portion of the parity based storage volume based on the optimization.

2. The method of claim 1, wherein the repetitive write command is part of a secure delete operation and wherein optimizing parity calculation and writing the pattern to the portion of the parity based storage volume comprise:
writing the pattern to the portion of the parity based storage volume without calculating or writing parity.

3. The method of claim 1, wherein setting the parity comprises:
responsive to determining the number of columns in the parity based storage is even, setting the parity equal to the pattern; and
responsive to determining the number of columns in the parity based storage is odd, setting the parity equal to zero.

4. The method of claim 1, wherein optimizing parity calculation and writing the pattern to the portion of the parity based storage volume comprise:
responsive to the flag being set, writing the pattern to the portion of the parity based storage volume without calculating or writing parity.

5. The method of claim 1, wherein setting the parity comprises setting the parity without performing an XOR calculation to calculate the parity.

6. The method of claim 1, wherein optimizing parity calculation for the repetitive write command comprises optimizing purity based on user preferences stored in a configuration file.

7. The method of claim 1, wherein the repetitive write command is a WRITE-SAME Small Computer System Interface (SCSI) command.

8. A computer program product comprising a non-transitory computer readable storage medium having a computer readable program stored therein, wherein the computer readable program, when executed on a storage controller, causes the storage controller to:
receive from a host device a repetitive write command and an associated pattern to be written a plurality of times to a portion of a parity based storage volume, wherein the parity based storage volume employs block-level striping with parity and wherein the repetitive write command has an associated flag;
determine whether the flag is set;
determine whether a size of data to be written by the repetitive write command spans a full stripe size of the parity based storage volume;
determine whether a stripe unit width of the parity based storage volume is a whole number multiple of a size of the associated pattern;
responsive to the storage controller determining that the flag is not set and the size of data to be written by the repetitive write command spans the full stripe size of the parity based storage volume and stripe unit width of the parity based storage volume is a whole number multiple of the size of the associated pattern, optimize parity calculation for the repetitive write command by the storage controller, wherein optimizing parity calculation comprises setting parity for each given stripe of the parity based storage volume to be the pattern or zero based on a number of columns in the parity based storage volume; and write the pattern with the parity to the portion of the parity based storage volume based on the optimization.

9. The computer program product of claim 8, wherein the repetitive write command is part of a secure delete operation and wherein optimizing parity calculation and writing the pattern to the portion of the parity based storage volume comprise:
writing the pattern to the portion of the parity based storage volume without calculating or writing parity.

10. The computer program product of claim 8, wherein optimizing parity calculation for the repetitive write command comprises optimizing parity based on user preferences stored in a configuration file.

11. The computer program product of claim 8, wherein the computer readable program is provided in a cloud computing node within a cloud environment.

12. The computer program product of claim 8, wherein setting the parity comprises:
responsive to determining the number of columns in the parity based storage is even, setting the parity equal to the pattern; and
responsive to determining the number of columns in the parity based storage is odd, setting the parity equal to zero.

13. The computer program product of claim 8, wherein optimizing parity calculation and writing the pattern to the portion of the parity based storage volume comprise:
responsive to the flag being set, writing the pattern to the portion of the parity based storage volume without calculating or writing parity.

14. The computer program product of claim 8, wherein setting the parity comprises setting the parity without performing an XOR calculation to calculate the parity.

15. An apparatus, comprising:
a processor; and
a memory coupled to the processor, wherein the memory comprises instructions which, when executed by the processor, cause the processor to:
receive from a host device a repetitive write command and an associated pattern to be written a plurality of times to a portion of a parity based storage volume, wherein the parity based storage volume employs block-level striping with parity and wherein the repetitive write command has an associated flag;
determine, by the storage controller, whether the flag is set;
determine, by the storage contoller, whether a size of data to be written by the repetitive write command spans a full stripe size of the parity based storage volume;
determine, by the storage controller, whether a stripe unit width of the parity based storage volume is a whole number multiple of a size of the associated pattern;
responsive to the storage controller determining that the flag is not set and the size of data to be written by the repetitive write command spans the full stripe size of the parity based storage volume and the stripe unit width of the parity based storage volume is a whole number multiple of the size of the associated pattern, optimize parity calculation for the repetitive write command by the storage controller, wherein optimizing parity calculation comprises setting parity for each given stripe of the parity based storage volume to be the pattern or zero based on a number of columns in the parity based storage volume; and write the pattern with the parity to the portion of the parity based storage volume based on the optimization.

16. The apparatus of claim 15, wherein the repetitive write command is part of a secure delete operation and wherein optimizing parity calculation and writing the pattern to the portion of the parity based storage volume comprise:

writing the pattern to the portion of the parity based storage volume without calculating or writing parity.

17. The apparatus of claim 15, wherein the apparatus is provided within a cloud computing node within a cloud environment.

18. The apparatus of claim 15, wherein setting the parity comprise:

responsive to determining the number of columns in the parity based storage is even, setting the parity equal to the pattern; and responsive to determining the number of columns in the parity based storage is odd, setting the parity equal to zero.

19. The apparatus of claim 15, wherein optimizing parity calculation and writing the pattern to the portion of the parity based storage volume comprise:

responsive to the flag being set, writing the pattern to the portion of the parity based storage volume without calculating or writing parity.

20. The apparatus of claim 15, wherein setting the parity comprises setting the parity without performing an XOR calculation to calculate the parity.

* * * * *